Patented Nov. 16, 1937

2,099,231

UNITED STATES PATENT OFFICE 2,099,231

HALOGENATION OF UNSATURATED COMPOUNDS

Jan D. Ruys, Pittsburg, and James W. Edwards, Concord, Calif., assignors to Shell Development Company, San Francisco, Calif., a corporation of Delaware No Drawing. Application June 10, 1935, Serial No. 25,940

20 Claims. (Cl. 260—162)

This invention relates to a novel process for the production of valuable halogenated organic compounds from unsaturated compounds by addition of a halogen to the double bond or bonds thereof.

More particularly, the invention relates to a practical and efficient method for effecting the halogenation, in either the liquid or gaseous phase, of unsaturated organic compounds possessing at least one olefinic linkage between two aliphatic carbon atoms, which comprises reacting such an unsaturated compound with a halogen under anhydrous conditions in the presence of a halogenation catalyst essentially comprising calcium chloride at a temperature at which the addition reaction proceeds at a practical rate while undesirable substitution reactions which would ordinarily occur to a prohibitive extent are substantially obviated.

A principal object of the invention is to provide a practical, economical and commercially applicable method for the manufacture of saturated polychlorides which possess at least two chlorine atoms to the molecule, one chlorine atom being linked to each of two vicinal carbon atoms. Of particular value are the products formed by adding a molecule of chlorine to the double bond of the olefines as ethylene and the mono-olefinic secondary base olefines. Such products include 1,2-dichlorethane, 1,2-dichlorpropane, 1,2-dichlorbutane, 2,3-dichlorbutane and the like. When diolefines as butadiene are chlorinated, the corresponding tetrachlor-compounds as 1,2,3,4-tetrachlorbutane may be obtained.

Another object of the invention is to provide a practical and effective method for the removal and recovery of the olefine content of mixtures comprising one or more relatively inert substances with the olefine or olefines present in relatively low concentrations. The invention is applicable with excellent results to the recovery of the normally gaseous olefines, namely, ethylene and propylene from their gaseous mixtures with relatively inert gaseous materials as nitrogen, hydrogen, carbon dioxide, paraffin hydrocarbons and the like, particularly when such mixtures contain olefinic material in such small amounts that known methods of recovery by conversion to saturated dihalides are impractical. For example, by our method we may recover, as ethylene dichloride, the ethylene content of industrial gases containing as little as 2% of ethylene.

The known methods of effecting the chlorination of olefines to the corresponding saturated chlorine addition products have failed to provide a practical and technically feasible process. In the absence of catalysts, particularly when vapor phase methods are used and the olefine is present in low concentrations, the addition reaction proceeds at a prohibitively slow rate and, besides the desired addition reaction, undesirable substitution reactions occur to a considerable extent with the liberation of HCl and formation of useless higher chlorinated products. The majority of valuable processes specify halogenation of the normally gaseous olefines, in the absence of diluents and impurities, with one or both of the reactants in the liquid phase. These methods necessitate costly compression and high pressure equipment and, further, substitution reactions are not obviated. Catalysts have been proposed for accelerating the reaction. However, the results obtained with the catalysts hitherto proposed have been unsatisfactory due to the fact that said catalysts accelerate both desirable and undesirable reactions and, in many cases, the percentage of the undesired substitution products surpasses that of the product of addition. Accordingly, the yields are low and excessive quantities of the more valuable reactant, namely, chlorine are consumed. Further, the catalysts hitherto used are, in many cases, relatively unstable and subject to rapid degeneration and loss of activity.

We have found a specific and highly effective catalyst which appears to accelerate substantially only the halogen addition reaction while suppressing undesirable substitution reactions. The specific accelerator consists of or essentially comprises dehydrated calcium chloride. By the use of catalyst masses consisting of or essentially comprising calcium chloride, we have brought the production of valuable saturated dichlorides from gases containing relatively small amounts of olefines within the field of practical utility.

The calcium chloride catalyst may be prepared by any suitable method known to the art and used alone or in mixtures comprising, in addition to dehydrated calcium chloride, one or more suitable compounds, for example, the halides of metals as barium, strontium, beryllium, nickel, iron, cobalt, copper, lead, molybdenum, aluminum, antimony and the like. The catalyst may be used in any convenient form, for example, as granules, pellets, powder, etc., or deposited on or mixed with a suitable carrier as pumice, silica, silica gel, asbestos, kieselguhr, charcoal and the like.

The invention is broadly applicable to the halogenation of unsaturated compounds containing at least one olefinic linkage between two aliphatic carbon atoms. The same is particularly applicable to the halogenation of olefines. The term "olefine" as used herein and in the appended claims is intended to include those unsaturated hydrocarbons possessing one or a plurality of olefinic linkages, said double bonds being between aliphatic carbon atoms. Particularly suitable olefines are ethylene and the secondary base monoolefines as propylene, $\alpha$-butylene, $\beta$-butylene, $\alpha$-amylene, $\alpha$-isoamylene and the like as well as their homologues, analogues and suitable substitution products. It is to be understood that the tertiary-base olefines as isobutylene, trimethyl ethylene, methyl ethyl ethylene and the like and their homologues and analogues are also contemplated. A suitable olefine may or may not be linked to a cyclic radical as of the aromatic, alicyclic and heterocyclic series, or the olefine may comprise an alicyclic structure. For example, unsaturated compounds as the phenyl and naphthyl ethylenes, propylenes, etc., are contemplated.

The olefines, regardless of their origin, may be applied severally or mixtures comprising a plurality of species may be treated and mixed products obtained. An olefine, or a mixture of olefines, may be halogenated in the presence of relatively large quantities of substantially inert materials. For example, mixtures of olefines and paraffins may be treated without separating the olefines therefrom. Such mixtures may be obtained by the pyrogenesis or cracking of petroleum, shale oils and petroleum products, and by the destructive distillation of coal, peat, pitches, asphalts and related carbonaceous material.

In utilizing cracked petroleum and petroleum product distillates, it may be advantageous to fractionate the same into fractions containing hydrocarbons which, for the most part, contain the same number of carbon atoms to the molecule. Typical fractions of this sort are the ethane-ethylene cut, the propane-propylene cut, etc. If desired, the olefines or a particular olefine may be separated from such a cut or the original mixture by fractionation, condensation, extraction and the like means provided said olefine is not present in prohibitively small amounts. For the manufacture of 1,2-dichlorethane, the ethylene-containing fraction of a reform gas obtained by the cracking of natural gas, which usually contains principally methane with about 4% to 5% ethylene, can be employed per se with excellent results.

The invention is preferably executed in the absence of water. In the presence of substantial amounts of water, the catalyst is in general less active and shorter lived and, in addition, the presence of water appears to accelerate substitution reactions resulting in materially decreased yields and high chlorine losses. If the reactants or their mixtures contain detrimental amounts of water, said water may be removed by any of the known methods. For example, the initial materials may be treated with a suitable drying agent and water removed.

The halogenation may be effected with the reactants in the liquid, vapor or liquid-vapor phase. The lower olefines, particularly the normally gaseous olefines, are preferably chlorinated with the reactants in the gas phase. The unsaturated compound to be chlorinated, either alone or in the presence of an inert substance, is mixed, prior to or preferably during its introduction to the reaction chamber in the gaseous state, with the gaseous chlorine. We prefer to employ an amount of halogen not in excess of that theoretically required to react with all of the olefine present by addition. The presence of an excess of the halogen is generally to be avoided for reasons of economy since one of the material advantages of the invention resides in the fact that by its use halogen losses are substantially obviated. In some cases, particularly when the reactants are employed in equivalent amounts or with the halogen in excess, it is desirable to abruptly cool the reaction mixture on its issuance from the reaction zone to minimize further reaction as interaction of reactants and products. We preferably employ the olefine in substantial excess of the amount of halogen necessary to completely react therewith. When all of the olefine is not reacted on one passage over or in contact with the catalyst, the reaction product may be separated from the effluent material by any suitable means as condensation at low temperatures, extraction with a suitable solvent, absorption by a suitable absorptive material as charcoal, silica gel, clay, etc., and the unreacted material reutilized in the same or another reaction stage. The reaction product may be recovered from the condensate, absorptive material, etc., by any suitable means as distillation, extraction and the like.

When executing the invention in the vapor phase, we may proceed as follows. The catalyst, usually in a granular form or in the form of pellets, is employed in manners customary in vapor phase catalytic reactions of this type. The desired quantity of the catalyst is contained in a suitable, preferably a cylindrical, reaction vessel and maintained at the desired reaction temperature while the gaseous mixture comprising the reactants is passed into contact with it at the desired space velocity and under the desired pressure. The space velocity is defined as the unit volume of gaseous material, measured at 0° C. and atmospheric pressure, contacted with a unit volume of catalyst per hour. The space velocity to be employed is dependent upon the temperature, the pressure, the relative amounts of the reactants present in the reaction mixture and the desired degree of conversion per pass. For example, operating conditions are adjusted so that substantially all of the halogen is reacted on one passage through the reaction vessel. The effluent material generally contains only traces of free halogen.

The halogenation is preferably effected at temperatures of from about 20° C. to about 120° C. Higher and lower temperatures may in some cases be used. At temperatures below about 20° C., the reaction, in many cases, proceeds at an impractical rate, while temperatures above about 120° C. are to be avoided as undesirable polymerization, condensation and substitution reactions generally occur, resulting in materially decreased yields. The temperature to be employed is largely dependent on the space velocity, that is, the contact time of the reactants with the catalyst. With the shorter contact times, higher temperatures may be used while with the longer contact times temperatures nearer the lower limit of the range are more suitable.

The halogen addition reaction is exothermic and a considerable amount of heat is liberated during the course of the reaction. To avoid excessively high reaction temperatures due to the liberated heat, it is necessary, in many cases, to provide cooling or other suitable means of maintaining the temperature of the catalyst mass substantially constant at the desired reaction temperature. By the use of suitable heat exchangers, internally and/or externally applied, through which a suitable heat-transmitting liquid may be circulated, the temperature of reaction may be effectively controlled. In some cases, by resorting to a proper method of distributing the reaction mixture throughout the catalyst bed, the whole may be kept at a substantially uniform temperature. Furthermore, the space velocity and extent of dilution of the reaction mixture may be varied and the temperature of reaction thereby controlled. For example, when substantially inert mixtures containing small amounts of olefinic material are employed, the large mass of inert material carries away a large part of the heat liberated. If the heat liberated is not sufficient to maintain the desired reaction temperature, external or internal heating means may be employed.

The invention is preferably executed at atmospheric or superatmospheric pressures. Pressures of from atmospheric to 3 atmospheres and higher may be advantageously employed. Elevated pressures, in general, favor the addition reaction and they are very advantageously employed when substantially inert gaseous mixtures of low olefine content are treated. The principal material advantage resides in the greater ease with which the reaction products may be separated from the effluent gas mixtures when condensation or absorption is effected under elevated pressures.

When a gaseous mixture containing a small amount of an olefine, for example about 4% ethylene, is treated and effective and substantially complete recovery of the reaction product from the effluent permanent gases, which may also contain unreacted ethylene, is desired, such recovery may be advantageously and efficiently effected by cooling the effluent gas mixture to a low temperature and condensing the product therefrom preferably under a superatmospheric pressure. This low temperature condensation is necessary, if efficient recovery is desired, due to the low partial pressure of the product in the effluent gas mixture.

The gaseous mixture leaving the reaction zone is conducted into a condenser stage maintained, by any suitable means, at the desired condensation temperature. In the condensation of the chlorine addition products of the normally gaseous olefines, condensation temperatures of about $-30°$ C. are suitable. The condenser may be maintained at temperatures of about $-30°$ C. by evaporating liquid ammonia which boils at about $-33.5°$ C.

Since product recovery from inert gaseous materials is more efficaciously effected under elevated pressures and, in addition, the reaction may be effected under elevated pressures, material advantages are inherent in this mode of executing the invention, since the intermediate step of compressing the gases leaving the reaction zone, which step would be necessary if the reaction were effected under atmospheric pressure, may be eliminated. Recovery of the reaction product by means other than condensation may also be more advantageously effected under elevated pressure.

The following specific example is introduced for the purpose of illustrating a preferred mode of executing our invention. It is to be understood that it is not our intention to limit the same to reactants therein employed or to the apparatus or operating conditions described.

*Example I*

The catalyst employed was commercial dehydrated calcium chloride in the form of pellets having an average diameter of about 8 mm.

Reaction was effected in a cylindrical reaction vessel having a diameter of about 20.32 cm. and packed with catalyst for a length of about 91.44 cm. The reaction vessel was provided with a plurality of small tubes running lengthwise through it and around which the catalyst was packed. Water was passed through these internal cooling tubes to maintain the catalyst mass at the desired temperature. The reaction chamber contained about 18 kilos of catalyst.

The gaseous ethylene-containing mixture treated was obtained by effecting the low temperature fractionation of cracked natural gas. The dry gas mixture contained about 4.1% ethylene and about 78% methane, the rest consisting mainly of hydrogen, nitrogen and carbon monoxide. The ethylene-containing gas was passed into the catalyst chamber at a rate of about 16.6 cubic meters per hour. Simultaneously chlorine gas was introduced into the inlet of the reaction chamber at a rate of about 1.36 kilos per hour.

No external heating was required. The temperature of the catalyst mass was maintained at the desired temperature by heat liberated by the occurrence of the exothermic reaction. The reaction tube was provided with thermocouple wells situated at distances of 2.54, 22.86, 63.5 and 91.44 cms. from the inlet of the reaction tube. The gaseous mixture entered the tube at a temperature of from 15° C. to about 20° C. The temperature of the catalyst mass measured 2.54, 22.86 and 63.5 cms. from the inlet was 49 to 52° C., 71 to 75° C. and 57 to 60° C., respectively. The outlet gases were at a temperature of from about 34° C. to about 35° C.

The reaction was effected under a pressure of from about 2 to 3 atmospheres.

The material leaving the reaction chamber was passed under pressure into a condenser and cooled to effect separation of the 1,2-dichlorethane from the permanent gases. The condenser was maintained at a temperature of about $-30°$ C. by means of evaporating liquid ammonia.

Analysis of a composite sample of the effluent gas showed that it contained only about 0.008% free chlorine and about 0.13% HCl. The effluent gas contained about 1.3% of ethylene.

The condensate was fractionated for recovery of the pure 1,2-dichlorethane. Substantially no higher chlorinated products were formed, indicating that substantially no substitution occurred. The first distillate cut, which comprised about 96% of the total still charge, boiled at about 83° C. to 84° C. under atmospheric pressure and was substantially pure 1,2-dichlorethane.

A total of about 347 cu. meters of the gas mixture were reacted with about 28.1 kilos of chlorine to yield about 35.24 kilos of 1,2-dichlorethane in about 21 hours. The yield of the product based on the ethylene consumed was about 87.7%.

The catalyst suffered no noticeable loss in activity and could be reutilized.

Example II

As in the previous example, the catalyst employed was commercial dehydrated calcium chloride in the form of pellets having an average diameter of about 8 mm.

The apparatus and the mode of operation were substantially the same as described in Example I with the exception that a small trap was installed between the converter and the condenser stages. This trap was for the purpose of condensing and collecting higher-boiling compounds present in the mixture leaving the converter. The material collected in this trap was designated as "by-product".

The gaseous ethylene-containing mixture was obtained by effecting the low temperature fractionation of cracked natural gas. The dry gas mixture used contained about 3.8% ethylene and about 78% methane, the rest being mainly hydrogen, nitrogen and carbon monoxide. The ethylene-containing gas was passed into the catalyst chamber at an average rate of about 13.2 cubic meters per hour. Simultaneously chlorine gas was introduced into the inlet of the reaction chamber at an average rate of about 0.95 kilo per hour.

The catalyst mass was maintained at the desired temperature by heat liberated in the course of the exothermic addition reaction. The temperature was controlled by means of water passed through the internal cooling coils around which the catalyst was packed. The gaseous mixture entered the reaction chamber at a temperature of from about 15° C. to about 20° C. The temperature of the catalyst mass measured about 20.32 cm. from the gas inlet was maintained at about 51° C. to about 71° C. It was found that when the temperature of this zone was maintained between about 51° C. and about 55° C. there was substantially no HCl in the effluent gas. The temperature about 61 cm. from the gas inlet was maintained at about 50° C. to about 55° C. The temperature measured near the outlet was about 46° C.

The reaction was effected under a gauge pressure of about 3 atmospheres.

The material leaving the reaction chamber was passed under the operating pressure into a condenser wherein it was cooled to effect separation of the 1,2-dichlorethane from the permanent gases. The condenser was maintained at a temperature of about −20° C. by means of evaporating liquid ammonia. This condensation temperature was too high. It is probable that if a temperature of −30° C. had been used, losses due to dichlorethane in the effluent gas would have been only about 4% instead of 11.4%.

The condensate was fractionated for recovery of substantially pure 1,2-dichlorethane. The material fractionated was free of $Cl_2$ and HCl. About 96% of the liquid product condensed was 1,2-dichlorethane.

The by-product material collected in the trap was fractionated. It was found to contain from 20% to about 85% dichlorethane, depending upon the temperature at which the trap was maintained.

A total of about 5,000 cu. meters of ethylene-containing gas (about 3.8% ethylene) was reacted with about 358.7 kilos of chlorine in about 379 hours to obtain 437.5 kilos of product.

The following table represents a material balance of the chlorine used in the operation.

*Chlorine applied—358.7 kilos*

| | | Kilos $Cl_2$ | Per cent |
|---|---|---|---|
| Main product | 437.5 kilos= | 313.80= | 87.47 |
| By-product | 3.2 kilos= | 2.26= | 0.63 |
| Lost as $FeCl_3$ in products | .31 gm.= | 0.02= | 0.01 |
| Lost in effluent gas | | | |
|   As free $Cl_2$ | 0.005% by vol.= | 0.77= | 0.21 |
|   As free HCl | 0.006% by vol.= | 0.45= | 0.13 |
|   As dichlorethane | 57.4 kilos= | 40.96= | 11.40 |
| Unaccounted for | | 0.44= | 0.15 |
| | | 358.7 | =100.0 |

Many times, the catalyst absorbs some of the reaction product, which absorbed material may not be carried into the condenser and recovered when the invention is executed at relatively low temperatures. This absorbed material may be distilled from the catalyst by heating the same to a temperature in excess of the boiling temperature of the product. If desired, recovery may be facilitated by passing an inert gas as nitrogen, steam, a paraffin hydrocarbon and the like, or the gaseous material treated, in the absence of a halogen, over the heated catalyst and condensing the reaction product. When the catalyst is no longer active, the absorbed product may be recovered therefrom by dissolving the entire mass in water and recovering the product from the solution.

Although the invention has been described with particular reference to the chlorination of olefines, it is to be understood that the same is applicable to the chlorination of other unsaturated organic compounds, and that halogens other than chlorine may be used.

It will be evident to those skilled in the art to which the invention appertains that the same may be executed in a batch, intermittent or continuous manner.

The polyhalogenated organic products prepared by our method are valuable for a wide variety of purposes. The dichlorides are particularly useful as solvents and components of solvent compositions, lacquers, insecticides, fungicides and the like. In addition, the halogenated products are valuable intermediates in the preparation of a wide variety of useful compounds as glycols, ethers, esters, acids, aldehydes, ketones, nitriles and the like.

The expression "substantial superatmospheric pressure" as used in the appended claims is intended to designate pressures materially greater than atmospheric, that is, pressures of about two (2) atmospheres (absolute) or higher.

While we have described our invention in a detailed manner and provided specific examples illustrating a suitable mode of executing the same, it is to be understood that modifications may be made without departing from the scope of the invention and that no limitations other than those imposed by the scope of the appended claims are intended.

We claim as our invention:

1. A process for the production of a valuable organic halogen addition product which comprises reacting a hydrocarbon possessing an olefinic linkage between two aliphatic carbon atoms with an amount of a halogen not in excess of that theoretically required to completely react therewith by addition, said reaction being effected under a substantial superatmospheric pressure and practically anhydrous conditions in the presence of a catalyst essentially comprising dehydrated calcium chloride at a temperature of from about 20° C. to about 120° C.

2. A process for the production of a valuable organic halogen addition product which comprises reacting a hydrocarbon possessing an olefinic linkage between two aliphatic carbon atoms with an amount of a halogen less than the amount theoretically required to completely react therewith by addition, said reaction being effected under a substantial superatmospheric pressure and practically anhydrous conditions in the presence of a dehydrated calcium chloride catalyst at a temperature of from about 20° C. to about 120° C.

3. A process for the production of a valuable organic halogen addition product which comprises reacting a hydrocarbon possessing an olefinic linkage between two aliphatic carbon atoms with a halogen, said reaction being effected in the liquid phase under a substantial superatmospheric pressure and practically anhydrous conditions and in the presence of a dehydrated calcium chloride catalyst at a temperature of from about 20° C. to about 120° C.

4. A process for the production of a valuable organic halogen addition product which comprises reacting a hydrocarbon possessing an olefinic linkage between two aliphatic carbon atoms with a halogen, said reaction being effected under a substantial superatmospheric pressure and practically anhydrous conditions in the presence of a dehydrated calcium chloride catalyst at a temperature of from about 20° C. to about 120° C.

5. A process for the production of a valuable organic chlorine addition product which comprises reacting a hydrocarbon possessing an olefinic linkage between two aliphatic carbon atoms with a chlorine, said reaction being effected under a substantial superatmospheric pressure and substantially anhydrous conditions in the presence of a relatively inert diluent material and in the presence of a dehydrated calcium chloride catalyst at a temperature of from about 20° C. to about 120° C.

6. A process for the production of a valuable organic halogen addition product which comprises reacting a hydrocarbon possessing an olefinic linkage between two aliphatic carbon atoms, said reaction being effected under a substantial superatmospheric pressure and practically anhydrous conditions in the presence of a relatively inert diluent material and in the presence of a dehydrated calcium chloride catalyst at a temperature of from about 20° C. to about 120° C.

7. A process for the production of a valuable halogen addition product of an olefine which comprises reacting an olefine with an amount of a halogen not in excess of the amount theoretically required to completely react therewith by addition, said reaction being effected under a substantial superatmospheric pressure and practically anhydrous conditions in the presence of a dehydrated calcium chloride catalyst at a temperature of from about 20° C. to about 120° C.

8. A process for the production of a valuable saturated organic dichloride which comprises reacting a mono-olefine with less than an equimolecular quantity of gaseous chlorine, said reaction being effected under a substantial superatmospheric pressure and practically anhydrous conditions in the presence of a substantially inert diluent material and in the presence of a dehydrated calcium chloride catalyst at a temperature of from about 20° C. to about 120° C.

9. A process for the production of a valuable organic halogen addition product from a gaseous mixture containing an olefine and a relatively much greater quantity of a substantially inert normally gaseous material which comprises adding thereto an amount of a gaseous halogen sufficient to react with the olefine present by addition and passing the gaseous mixture under a substantial superatmospheric pressure and substantially anhydrous conditions into contact with a dehydrated calcium chloride catalyst maintained at a temperature of from about 20° C. to about 120° C.

10. A process for the production of a valuable saturated organic dichloride from a gaseous mixture containing a mono-olefine and a relatively much greater quantity of a substantially inert normally gaseous material which comprises adding thereto an amount of gaseous chlorine less than would be required to completely react with all of the olefine present by addition and passing the gaseous mixture under a substantial superatmospheric pressure and substantially anhydrous conditions into contact with a dehydrated calcium chloride catalyst at a temperature of from 20° C. to about 120° C.

11. A process for the production of a valuable saturated organic dichloride from a gaseous mixture containing a mono-olefine and a relatively much greater quantity of a substantially inert normally gaseous material which comprises adding thereto gaseous chlorine and passing the gaseous mixture under a substantial superatmospheric pressure and substantially anhydrous conditions into contact with a dehydrated calcium chloride catalyst at a temperature of from about 20° C. to about 120° C., abruptly cooling the reaction mixture subsequent to its contact with the catalyst to obviate further reaction and to condense the reaction product, and recovering the reaction product from the condensate.

12. A process for the production of a valuable saturated organic dichloride from a gaseous mixture containing a mono-olefine and a relatively much larger quantity of a substantially inert normally gaseous material which comprises adding thereto an amount of gaseous chlorine less than that which would be required to completely react with all of the olefine present by addition and passing the gaseous mixture under a substantial superatmospheric pressure and practically anhydrous conditions into contact with a dehydrated calcium chloride catalyst maintained at a temperature of from about 20° C. to about 120° C., then cooling the treated material to a temperature of about —30° C. to condense the reaction product and effect its separation from the permanent gases, and recovering the reaction product from the condensate.

13. A process for the production of a valuable saturated organic dichloride from a gaseous mixture comprising a paraffin hydrocarbon and a relatively small amount of a mono-olefine which comprises adding thereto an amount of gaseous chlorine less than that theoretically required to react with all of the olefine present by addition and passing the gaseous mixture under a substantial superatmospheric pressure and substantially anhydrous conditions into contact with a catalyst comprising dehydrated calcium chloride and maintained at a temperature of from about 20° C. to about 120° C.

14. A process for the production of a valuable organic halogen addition product from a mixture containing an olefine and a relatively much greater quantity of substantially inert material which comprises adding thereto a halogen and effecting the addition reaction under a substantial superatmospheric pressure and in the presence of a dehydrated calcium chloride catalyst at a temperature of from about 20° C. to about 120° C. and recovering the reaction product from the reaction mixture.

15. A process for the production of a mixture of valuable saturated organic dihalides which comprises reacting a mixture of mono-olefines with an amount of a halogen not in excess of that theoretically required to completely react with the olefines by addition, said reaction being effected under a substantial superatmospheric pressure and substantially anhydrous conditions in the presence of a dehydrated calcium chloride catalyst at a temperature of from about 20° C. to about 120° C.

16. A process for the production of 1,2-dichlorethane which comprises reacting ethylene with less than an equivalent amount of gaseous chlorine under a substantial superatmospheric pressure and practically anhydrous conditions and in the presence of a dehydrated calcium chloride catalyst at a temperature of from about 20° C. to about 120° C., abruptly cooling the reacted mixture to a low temperature to condense the reaction product and effect its separation from the unreacted ethylene and recovering the 1,2-dichlorethane from the condensate.

17. A process for the production of 1,2-dichlorethane from a gaseous mixture containing ethylene and a relatively much greater quantity of a substantially inert normal gaseous material which comprises adding thereto an amount of gaseous chlorine not in excess of that theoretically required to react with all of the ethylene and passing the gaseous mixture under a substantial superatmospheric pressure and practically anhydrous conditions into contact with a dehydrated calcium chloride catalyst maintained at a temperature of from about 20° C. to about 120° C., then cooling the reacted mixture to a temperature of about −30° C. to condense the reaction product and effect its substantially complete separation from the permanent gases, and recovering the 1,2-dichlorethane from the condensate.

18. A process for the production of 1,2-dichlorethane from a gaseous mixture consisting for the most part of methane and containing about 4% to about 5% by volume of ethylene which comprises adding thereto an amount of gaseous chlorine less than that theoretically required to react with all of the ethylene present by addition and passing the gaseous mixture under a substantial superatmospheric pressure and practically anhydrous conditions into contact with a dehydrated calcium chloride catalyst maintained at a temperature of from about 20° C. to about 120° C., and recovering the product from the gaseous reacted mixture.

19. A process for the production of 1,2-dichlorethane which comprises mixing a gaseous mixture consisting for the most part of methane and containing about 4% to about 5% by volume of ethylene with an amount of gaseous chlorine substantially equivalent to the olefine content of the gaseous mixture and passing the substantially anhydrous mixture into contact with a dehydrated calcium chloride catalyst at a temperature of from about 20° C. to about 120° C. for a time sufficient to effect substantially complete reaction, cooling the reacted mixture to a temperature of about −30° C. to separate the reaction product from the permanent gases by condensation, and recovering the 1,2-dichlorethane from the condensate.

20. A process for the production of 1,2-dichlorethane which comprises adding to a gaseous mixture consisting for the most part of methane and containing about 4% to about 5% by volume of ethylene an amount of gaseous chlorine which is less than that theoretically required to react with all of the ethylene present by addition and passing the gaseous mixture under a substantial superatmospheric pressure and practically anhydrous conditions into contact with a dehydrated calcium chloride catalyst at a temperature of from about 20° C. to about 120° C. and for a time sufficient to effect substantially complete reaction of the chlorine, cooling the reacted mixture to separate the reaction product from the permanent gases by condensation, and recovering the 1,2-dichlorethane from the condensate.

JAN D. RUYS.
JAMES W. EDWARDS.